United States Patent
Suzuki

(10) Patent No.: US 11,277,555 B2
(45) Date of Patent: Mar. 15, 2022

(54) IMAGE PICKUP APPARATUS THAT PERFORMS FOCUS BRACKETING, CONTROL METHOD THEREFOR, AND STORAGE MEDIUM

(71) Applicant: CANON KABUSHIKI KAISHA, Tokyo (JP)

(72) Inventor: Takayuki Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/907,629

(22) Filed: Jun. 22, 2020

(65) Prior Publication Data
US 2020/0412971 A1    Dec. 31, 2020

(30) Foreign Application Priority Data

Jun. 28, 2019   (JP) .............................. JP2019-121811

(51) Int. Cl.
*H04N 5/232*    (2006.01)

(52) U.S. Cl.
CPC ... *H04N 5/232133* (2018.08); *H04N 5/23227* (2018.08)

(58) Field of Classification Search
CPC ......... H04N 5/232133; H04N 5/23227; H04N 5/232123; H04N 5/232
See application file for complete search history.

(56) References Cited

U.S. PATENT DOCUMENTS

| 10,234,653 | B2 | 3/2019 | Oogami | |
| 2008/0079839 | A1* | 4/2008 | Sung | G02B 13/001 348/345 |
| 2013/0033638 | A1* | 2/2013 | Hamada | H04N 5/23209 348/345 |
| 2016/0073021 | A1* | 3/2016 | Chang | H04N 5/23238 348/37 |

FOREIGN PATENT DOCUMENTS

WO    2017090233 A1    6/2017

* cited by examiner

*Primary Examiner* — Yogesh K Aggarwal
(74) *Attorney, Agent, or Firm* — Rossi, Kimms & McDowell LLP

(57) ABSTRACT

Provided is an image pickup apparatus capable of selection of a first shot image taken in focus bracketing as a shot image at a user's desired focus position. A focus step is an amount of change in focus position between adjacent shot images. A focus lens is driven so as to achieve a focus change speed such that the amount of change in focus per unit time is constant. A vertical synchronization signal is issued to an image pickup device on the basis of a start focus position. A reference position at which a focus position comes to the start focus position in a first shot image generated in the focus bracketing is set. A focus position at the start of exposure is determined based on a time period required for one readout by the image pickup device, an exposure time period, the focus change speed, and the reference position.

9 Claims, 13 Drawing Sheets

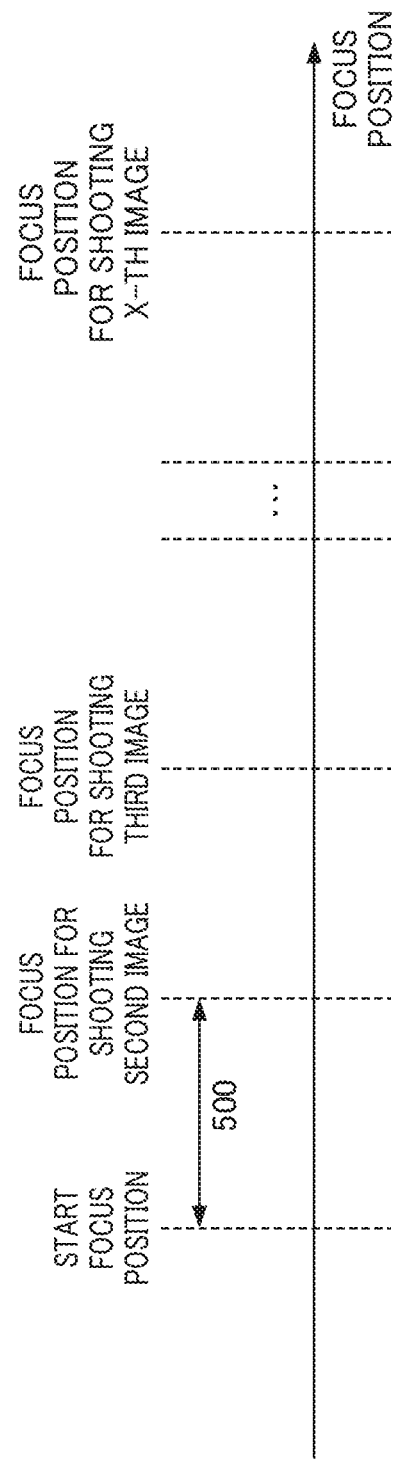

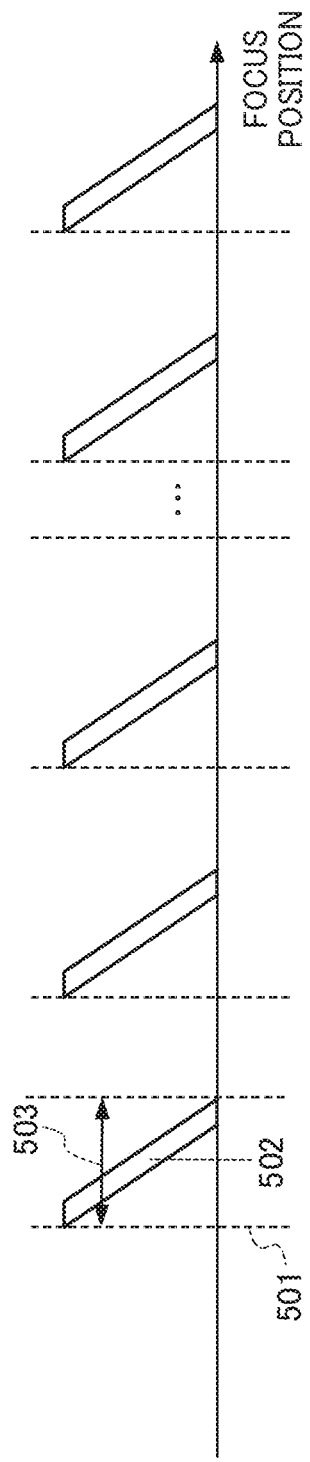

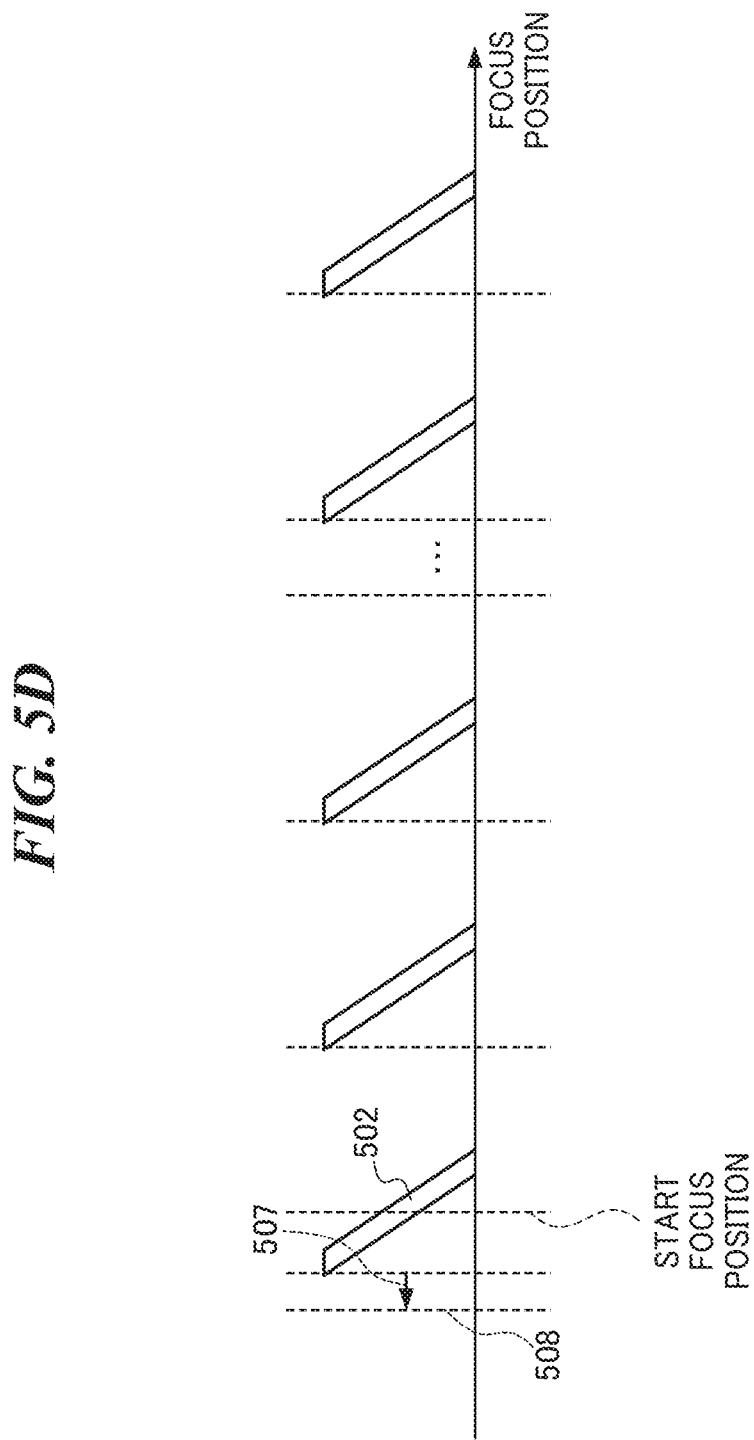

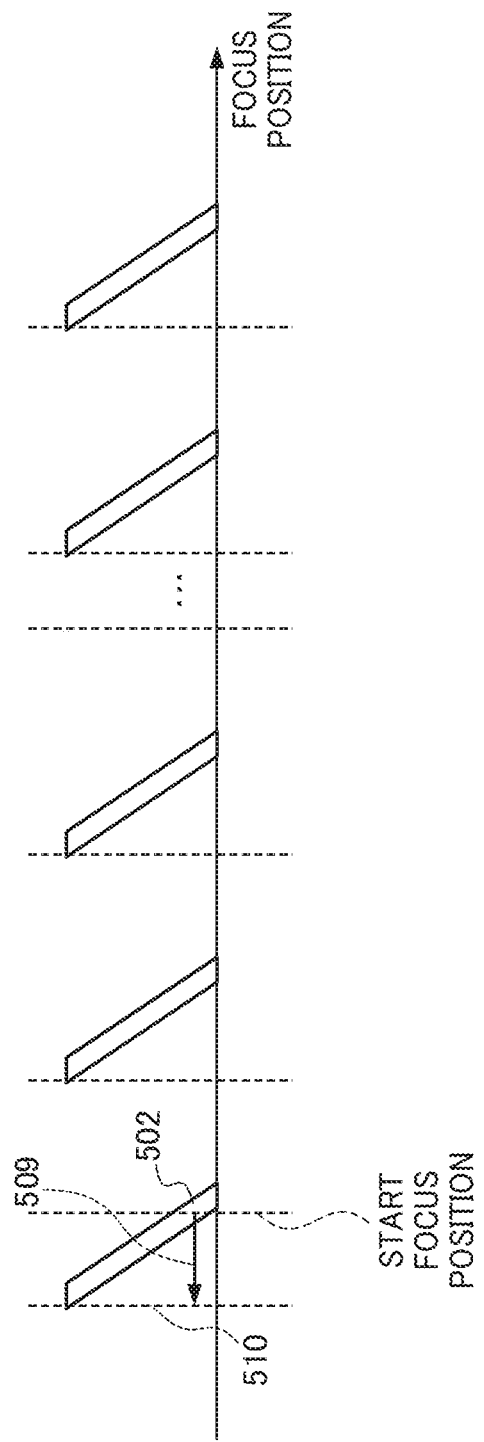

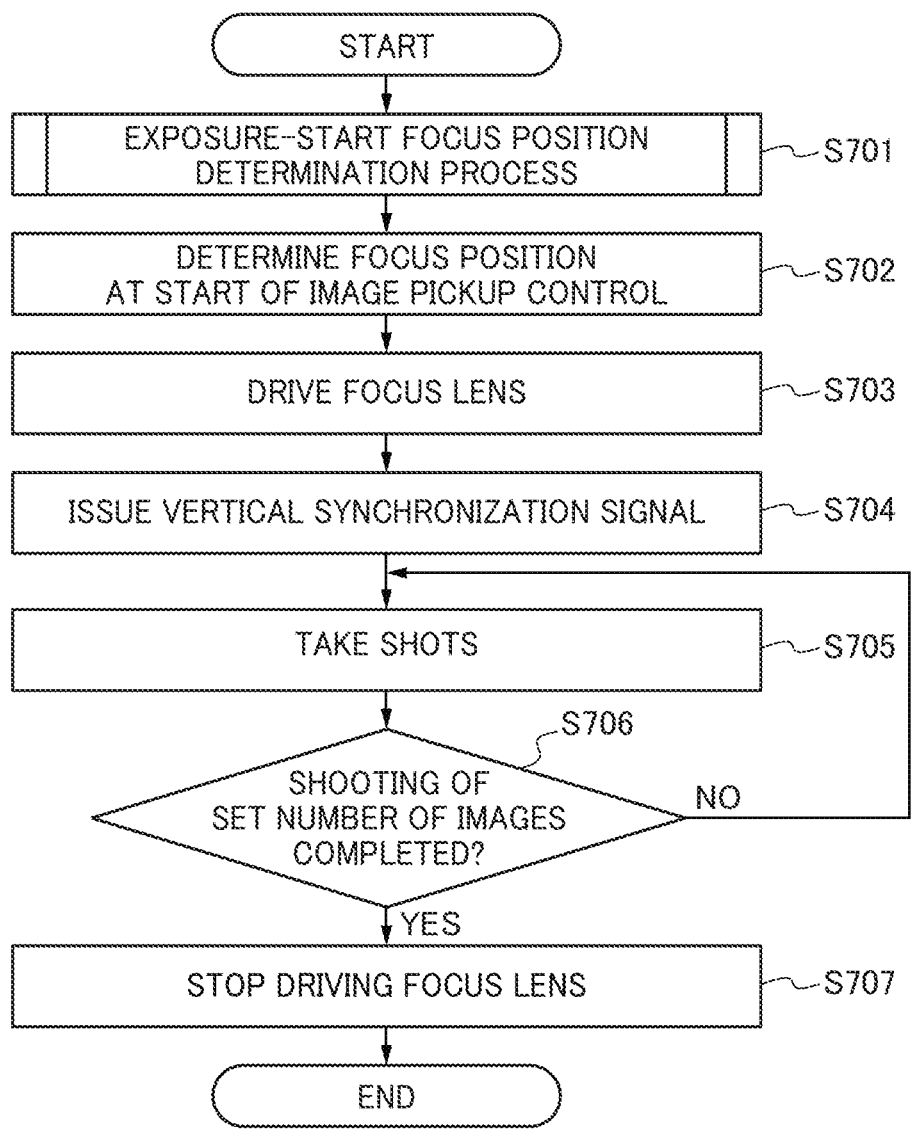

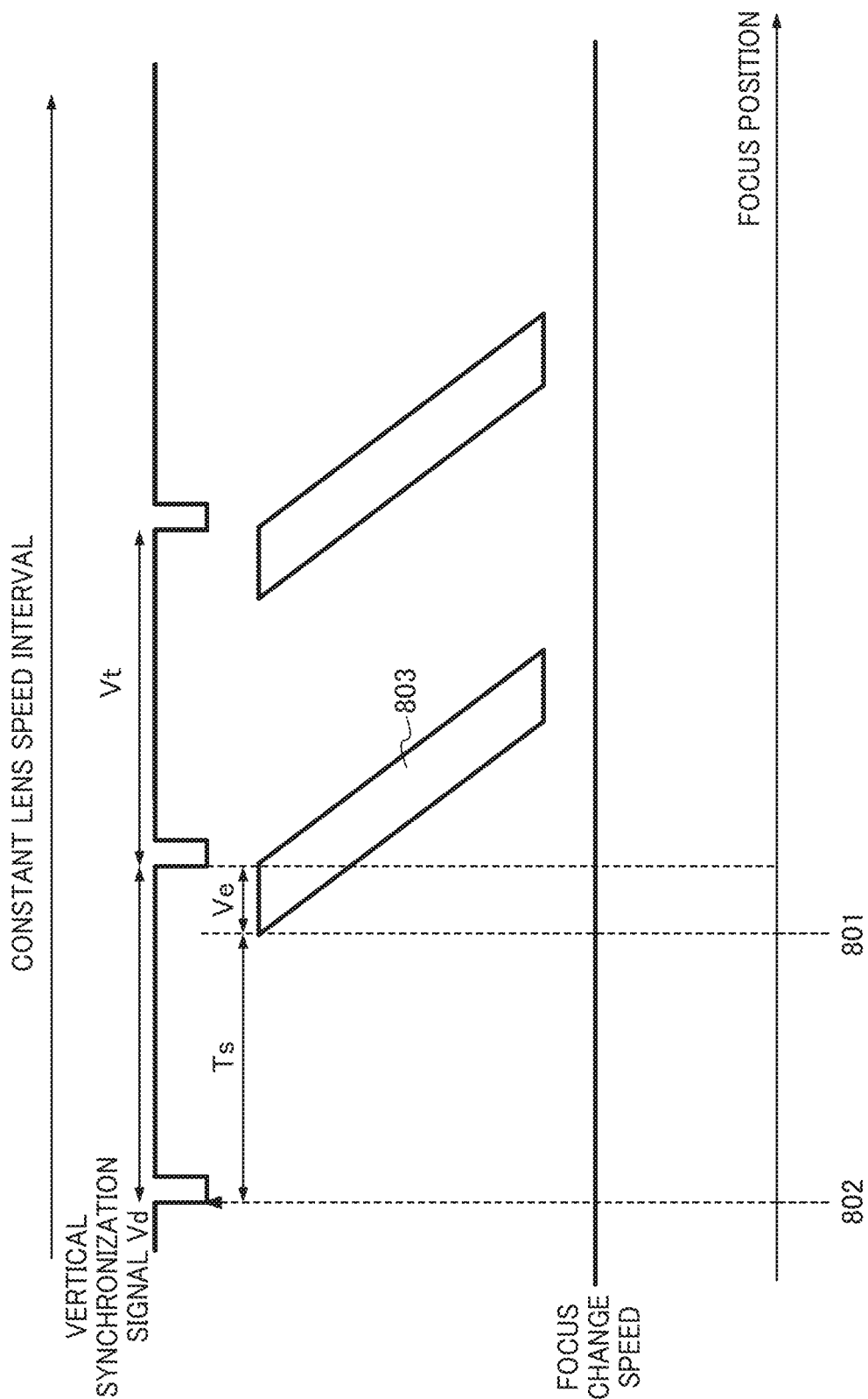

IMAGE PICKUP APPARATUS THAT PERFORMS FOCUS BRACKETING, CONTROL METHOD THEREFOR, AND STORAGE MEDIUM

BACKGROUND OF THE INVENTION

Field of the Invention

The present invention relates to an image pickup apparatus, a control method therefor, and a storage medium, and in particular to an image pickup apparatus that is capable of creating omnifocal images or fully-focused images with focus bracketing, a control method therefor, and a storage medium.

Description of the Related Art

Conventionally, image pickup apparatuses that create omnifocal images or fully-focused images are known. To create an omnifocal image, such an image pickup apparatus uses focus bracketing to take multiple bracketed shots at different focus positions across the whole range of a camera-to-subject distance at which the image pickup apparatus can focus, extracts areas in focus from the respective shot images, and merges them to form an image that is fully focused over the entire shooting area. When creating an omnifocal image, an image pickup apparatus needs to take multiple images in response to one user's operation for shooting, and hence it may take long time to finish taking all the shots after accepting the operation for shooting (hereafter referred to merely as "the shooting time").

One of techniques to reduce the shooting time in focus bracketing is a technique of driving a lens during exposure, in which a focus lens is driven during exposure of the image pickup device. In a shooting sequence to create an omnifocal image, the focus lens is stopped at a certain focus position during exposure, and after exposure is completed, the focus lens is driven to a next focus position, and after waiting for the focus lens to be static, a next shooting operation is performed. In focus bracketing using the technique of driving a lens during exposure, multiple shots are taken at times when the focus lens reaches respective focus positions while continuing to be driven, and therefore, it is unnecessary to wait for the focus lens to be driven and static. As a result, the shooting time can be reduced.

Moreover, the amount of camera shake tends to increase as the shooting time increases. Focus bracketing using the technique of driving a lens during exposure, allows a handheld image pickup apparatus to create an image with less camera shake in comparison with a creation of an omnifocal image without using the lens driving technique.

International Publication No. 2017/090233 discloses a method that switches between the following two shooting modes according to shooting conditions: a normal shooting mode and a focus bracketing mode using the technique of driving a lens during exposure.

However, conventional focus bracketing using the technique of driving a lens during exposure has the problem that it is impossible for a user to select a first shot image obtained in the focus bracketing as a shot image at a desired focus position.

Specifically, in conventional focus bracketing using the technique of driving a lens during exposure, the focus lens continues to be driven even during exposure and readout of the image pickup device. Thus, a focus position at the time of exposure and readout around a first row of the image pickup device is different from a focus position at the time of exposure and readout around a last row of the image pickup device. For this reason, even if a user determines a desired focus position in advance as a focus position at the start of shooting (start focus position), an area focused at the desired focus position in a first shot image is only an area that represents a result of readout around the first row of the image pickup device. Namely, in the first shot image, a focus position in an area that represents a result of readout around the last row of the image pickup device is greatly displaced from the desired focus position. Thus, even if a user wants to select an image focused around the desired focus position, which is determined by him or her in advance as the start focus position, such an image cannot be taken by conventional focus bracketing using the technique of driving a lens during exposure.

Moreover, in the technique of driving a lens during exposure, the focus lens is moved from a standstill and thus cannot be moved from the beginning at a desired focus change speed. Namely, the focus lens starts to be driven at a lower focus change speed than the desired focus change speed and then gradually accelerates to the desired focus change speed. On the other hand, in conventional focus bracketing using the technique of driving a lens during exposure, exposure and readout of the image pickup device are started at the same time when the focus lens starts to be driven, and hence the first shot image is different from second and subsequent shot images in terms of the focus change speed. Namely, in conventional focus bracketing using the technique of driving a lens during exposure, a user cannot select the first shot image as a shot image at his or her desired focus position.

SUMMARY OF THE INVENTION

The present invention provides an image pickup apparatus, a control method therefor, and a storage medium, which allow an user to select a first shot image taken in focus bracketing using the technique of driving a lens during exposure, as a shot image at a focus position desired by the user.

Accordingly, the present invention provides an image pickup apparatus that performs focus bracketing in which exposure and readout of an image pickup device are performed the number of times set in advance while a focus lens is driven without being stopped, so as to generate a set number of shot images. The image pickup apparatus comprises: a focus lens; an image pickup device; a memory device that stores a set of instructions; and at least one processor that executes the set of the following instructions. The at least one processor executes the instructions to: set a focus step that is an amount of change in focus position between adjacent shot images of the set number of shot images; and control driving of the focus lens so as to make the focus lens achieve a focus change speed such that the amount of change in focus per unit time is constant. The at least one processor further executes the instructions to: issue a vertical synchronization signal to the image pickup device on a basis of a start focus position set in advance; and set a reference position at which a focus position comes to the start focus position in a first shot image generated in the focus bracketing. The at least one processor further executes the instructions to: determine a focus position at a start of exposure, based on a time period required for one readout by the image pickup device, an exposure time period determined based on shooting conditions, the focus change speed, and the reference position.

According to the present invention, a first shot image taken in focus bracketing using the technique of driving a lens during exposure can be selected as a shot image at a focus position desired by a user.

Further features of the present invention will become apparent from the following description of exemplary embodiments (with reference to the attached drawings).

BRIEF DESCRIPTION OF THE DRAWINGS

FIG. 5A is a view showing a start focus position and focus positions for shooting second and subsequent shot images in focus bracketing.

FIG. 5B is a view showing how a focus position changes during exposure and readout when conventional focus bracketing is performed.

FIG. 5D is a view showing a focus position at the start of driving a focus lens during focus bracketing according to the embodiment 1.

FIG. 5E is a view showing a focus position of the focus lens at the start of exposure during focus bracketing according to a variation of the embodiment 1.

FIG. 7 is a flowchart of a focus bracketing process according to an embodiment 2.

FIG. 8 is a timing chart of the focus bracketing process according to the embodiment 2.

DESCRIPTION OF THE EMBODIMENTS

The present invention will now be described in detail with reference to the accompanying drawings showing embodiments thereof.

Figure 1:
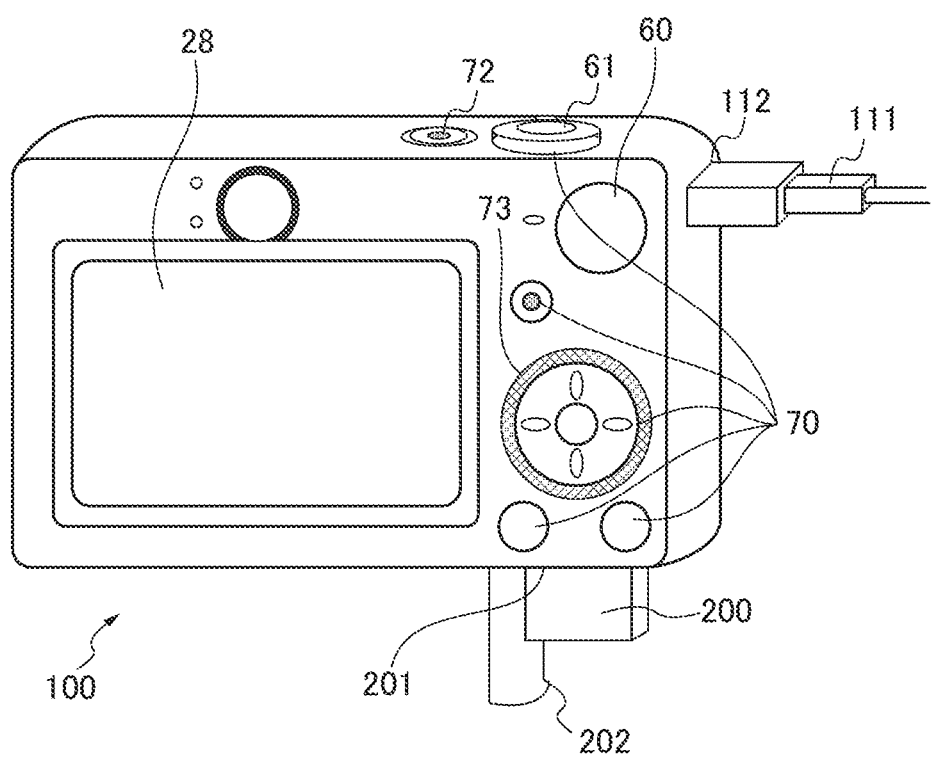
FIG. 1 is a view showing an appearance of a digital camera which is an image pickup apparatus according to the present invention.

FIG. 1 is a view showing an appearance of a digital camera 100 which is an image pickup apparatus according to the present invention.

Referring to FIG. 1, the digital camera 100 has a display unit 28, a mode selector switch 60, a shutter button 61, an operation unit 70, a power switch 72, a controller wheel 73, a connector 112, a recording medium 200, a recording medium slot 201, and a lid 202.

The display unit 28 displays images and various types of information.

The mode selector switch 60 is an operation unit for switching among various modes.

The shutter button 61 is an operation unit for issuing shooting instructions.

The operation unit 70 is comprised of operation members (input devices) such as various switches, buttons, and a touch panel which receive various operations from a user.

The power switch 72 turns on and off the power to the digital camera 100.

The controller wheel 73 is a turnable operation member included in the operation unit 70.

The connector 112 is for connecting the connecting cable 111 and the digital camera 100 together.

The recording medium 200 is a memory card, a hard disk, or the like.

The recording medium slot 201 is a slot for housing the recording medium 200. The recording medium 200 housed in the recording medium slot 201 becomes capable of communicating with the digital camera 100.

The lid 202 is a cover for the recording medium slot 201.

Figure 2:
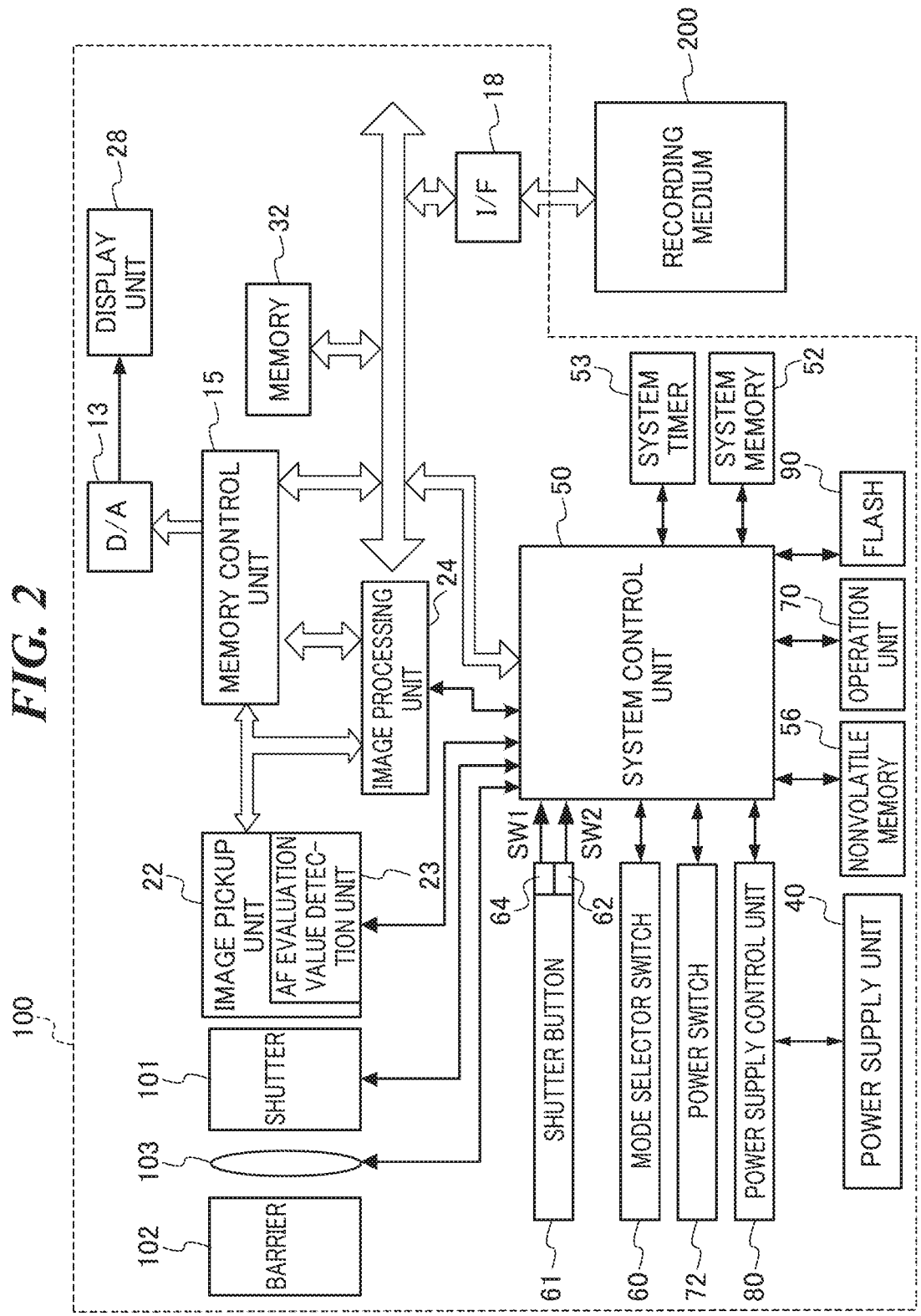
FIG. 2 is a block diagram showing a hardware arrangement of the digital camera in FIG. 1.

FIG. 2 is a block diagram showing a hardware arrangement of the digital camera 100 in FIG. 1.

Referring to FIG. 2, the digital camera 100 has an image pickup system which includes a shutter 101, a barrier 102, a focus lens 103, and an image pickup unit 22.

The shutter 101 has a diaphragm function.

The barrier 102 covers the image pickup system of the digital camera 100 to prevent the image pickup system from becoming soiled or damaged.

The focus lens 103 is a lens included in a lens group, not shown, disposed between the shutter 101 and the barrier 102. It should be noted that this lens group also includes other lenses such as a zoom lens.

The image pickup unit 22 has an image pickup device comprised of a CCD or CMOS device which converts an optical image into an electric signal, and an A/D conversion function. Output data (shot images) from the image pickup unit 22 is written into a memory 32 via an image processing unit 24 and a memory control unit 15 or directly written into the memory 32 via the memory control unit 15. During focus bracketing using the technique of driving a lens during exposure, which will be described later, all of shot images corresponding in number to a set, number of images are written into the memory 32.

The digital camera 100 also has an AF evaluation value detection unit 23, a flash 90, the image processing unit 24, the memory 32, a D/A converter 13, the display unit 28, a nonvolatile memory 56, a system control unit 50, and a system timer 53.

The AF evaluation value detection unit 23, which is provided in the image pickup unit 22, calculates an AF evaluation value based on, for example, contrast information obtained from a digital image signal and outputs the calculated AF evaluation value from the image pickup unit 22 to the system control unit 50.

When taking a shot, the flash 90 fires a flash of light so as to supplement lighting in a low-lit scene or a backlit scene.

The image processing unit 24 carries out a resizing process, such as predetermined pixel interpolation and reduction, and a color conversion process on image data output from the image pickup unit 22 or image data output from the memory control unit 15. The image processing unit 24 performs a predetermined computation process using shot image data, and based on a result of computation, the system control unit 50 controls exposure and metering. As a result, an AE (auto-exposure) process using the TTL (through-the-lens) method and an EF (automatic flash exposure control and flash firing) process are carried out. In the image processing unit 24, an AF (auto-focusing) process is also carried out, and at this time, an output from the AF evaluation value detection unit 23 provided in the image pickup unit 22 is used sometimes. Furthermore, in the image processing unit 24, a predetermined computation process is carried out using shot image data, and an AWB (auto white balancing) process using the TTL method is carried out based on a result of computation.

The memory 32 stores image data which has been obtained and subjected to AD conversion by the image pickup unit 22 and image data which is to be displayed on the display unit 28. The memory 32 has an enough storage capacity to store a predetermined number of still images as well as moving images and audio for a predetermined period of time. The memory 32 also serves as a memory (video memory) which stores images for display.

The D/A converter 13 converts data for image display, which is stored in the memory 32, into analog signals and supplies them to the display unit 28. The data for image display written into the memory 32 is thus displayed on the display unit 28 via the D/A converter 13.

The display unit 28 produces displays on a display such as an LCD according to analog signals from the D/A converter 13. Digital signals, which have been subjected to A/D conversion once by the image pickup unit 22 and accumulated in the memory 32, are converted into analog signals by the D/A converter 13 and successively transferred to the display unit 28. Thus, the display unit 28 functions as an electronic viewfinder to display through-the-lens images.

The nonvolatile memory 56 is an electrically erasable programmable memory and is, for example, a flash memory. Constants for operation of the system control unit 50, programs, and so forth are stored in the nonvolatile memory 56. Here, the programs mean those for executing various flowcharts in embodiments 1 and 2, which will be described later.

The system control unit 50 controls the overall operation of the digital camera 100. Specifically, by executing the above mentioned programs recorded in the nonvolatile memory 56, the system control unit 50 implements focus bracketing using the technique of driving a lens during exposure according to the embodiments 1 and 2, which will be described later, based on subject information, subject distance, and image contrast information. Namely, in this focus bracketing, the system control unit 50 drivingly controls the focus lens 103 and the shutter 101 to sequentially shoot multiple images at different focus positions. It should be noted that as the amount of change in focus position between adjacent shot images (a focus step) taken in this shooting process, a value obtained by a user selecting from a plurality of values set in advance via the operation unit 70 is set by the system control unit 50.

The system memory 52 is comprised of a RAM or the like, and constants for operation of the system control unit 50, variables, programs read out from the nonvolatile memory 56, and so forth are expanded on the system memory 52. The system control unit 50 also controls display by controlling the memory 32, the D/A converter 13, the display 28, and so forth.

The system timer 53 is a clocking unit that measures time for use in various types of control and time indicated by a built-in clock.

The digital camera 100 also has operation means (input devices), which is comprised of the mode selector switch 60, a first shutter switch 64, a second shutter switch 62, and the operation unit 70, for inputting various operating instructions to the system control unit 50.

The mode selector switch 60 switches the operating mode of the system control unit 50 to one of a still image recording mode, a moving image recording mode, a reproducing mode, and so forth. Modes included in the still image recording mode are an auto shooting mode, an auto scene determination mode, a manual mode, various scene modes with shooting settings varying with shooting scenes, a programmed AE mode, a custom mode, and so forth. With the mode selector switch 60, the operating mode of the system control unit 50 is switched directly to one of those modes included in the still image shooting mode. Alternatively, after the operating mode of the system, control unit 50 is switched to the still image shooting mode with the mode selector switch 60, another operation member (input device) may be used to switch the operating mode of the system control unit 50 to one of those modes included in the still image shooting mode. Likewise, a plurality of modes may be included in the moving image shooting mode as well.

The first shutter switch 64 is turned on by operating the shutter button 61, which is provided in the digital camera 100, part way, that is, by pressing the shutter button 61 halfway down (shooting preparation instruction) and issues a first shutter switch signal SW1. In response to the first shutter switch signal SW1, the system control unit 50 starts an operation such as an AF (auto-focusing) process, an AE (auto-exposure) process, an AWB (auto white balancing) process, or an EF (auto flash light control and flash firing) process. It should be noted that a user can select a single center point AF process or a face AF process as the AF process started in response to the above shooting preparation instruction. Here, the single center point AF process means a process in which auto focusing is performed on a single point at the center of a shooting screen, and the face AF process means a process in which auto focusing is performed on a face in a shooting screen, which is detected using a face detecting function.

The second shutter switch 62 is turned on by completing operation on the shutter button 61, that is, by pressing the shutter button 61 all the way down (shooting instruction) and issues a second shutter switch signal SW2. In response to the second shutter switch signal SW2, the system control unit 50 starts a sequential shooting process from signal readout from the image pickup unit 22 to writing of image data into the recording medium 200.

Functions are assigned as appropriate to respective operation members of the operation unit 70 on a scene-by-scene basis by, for example, a user selecting various function icons displayed on the display unit 28, and as a result, the operation members act as respective function buttons. Examples of the function buttons include an end button, a back button, an image feed button, a jump button, a narrow-down button, and a property changing button. For example, when a menu button is pressed, a menu screen on which various settings can be made is displayed on the display unit 28. A user can intuitively make various settings using the menu screen displayed on the display unit 28 and four-direction buttons comprised of up, down, right, and left buttons and a set button.

The controller wheel 73 is a turnable operation member included in the operation unit 70 and used with the direction buttons to designate selection items. When the controller wheel 73 is turned, an electric pulse signal is generated according to the amount of the turn, and based on this pulse signal, the system control unit 50 controls the components of the digital camera 100. Based on this pulse signal, an angle at which the controller wheel 73 has been turned and the number of revolutions of the controller wheel 73 can be determined. It should be noted that the controller wheel 73 may be anything as long as it is an operation member whose turn can be detected. For example, the controller wheel 73 may be a dialing member that turns itself in response to a user's turn operation and generates a pulse signal. The controller wheel 73 may also be what is called a touch wheel which does not turn itself but detects the movement of a user's finger or the like on it.

The digital camera 100 also has a power supply control unit 80, a power supply unit 40, and a recording medium I/F 18.

The power supply control unit 80 is comprised of a battery detecting circuit, a DC-DC converter, a switch circuit that switches blocks to be energized, and so forth, and detects the presence of a battery that is installed, a type of the battery, and a remaining capacity of the battery. Based on results of detection and an instruction from the system control unit 50, the power supply control unit 80 controls the DC-DC converter and supplies required voltage to the components including the recording medium 200 for a required period of time.

The power supply unit 40 is comprised of a primary battery such as an alkali battery or a lithium battery, a secondary battery such as a NiCd battery, a NiMH battery, or a Li battery, an AC adapter, and so forth.

The recording medium I/F 18 is an interface to the recording medium 200 such as a memory card or a hard disk. The recording medium 200 is a memory card or the like for recording shot images and is comprised of a semiconductor memory, a magnetic disk, and so forth.

A description will now be given of focus bracketing using the technique of driving a lens during exposure.

Focus bracketing using the technique of driving a lens during exposure refers to shooting in which exposure and readout of the image pickup unit 22 are performed while the focus lens 103 continues to be driven. During this focus bracketing, the system control unit 50 controls the focus lens 103 such that the focus lens 103 continues to move without stopping while the amount of change in focus per unit time (the focus change speed) is constant (control of focus lens driving). In general, to stop the focus lens 103, it is necessary to wait for it to be static, and when driving the focus lens 103 from a standstill, it is necessary to gradually accelerate the focus lens 103 until the focus lens 103 reaches a predetermined moving speed. On the other hand, since the focus lens 103 is not stopped during the control described above, there is no need to wait for the focus lens 103 to be static, and also there is no need to accelerate the focus lens 103 from a standstill until a predetermined amount of change in focus is reached. Therefore, focus bracketing can be performed at high speed.

In the following description, focus bracketing using the technique of driving a lens during exposure is referred to merely as focus bracketing.

The focus change speed during focus bracketing is determined by the performance of the focus lens 103 and the time required for readout by the image pickup device in the image pickup unit 22. Specifically, the system control unit 50 determines the focus change speed so that the amount of change in focus position during readout will not exceed the amount of change in focus position determined by the focus step mentioned above. As a result, the amount of change in focus within a shot image can reliably fall within the focus step.

The digital camera 100 is a digital camera with an integrated lens group including the focus lens 103, but the image pickup apparatus according to the present invention may be a lens interchangeable digital camera that a removable lens barrel including the focus lens 103 is attachable to and detachable from.

Referring to FIGS. 3 to 8, a description will now be given of operations in the embodiments of the present invention.

Embodiment 1

The embodiment 1 shows a sequence of operations to perform focus bracketing using the technique of driving a lens during exposure, which is started in a state in which the focus lens 103 is at a standstill.

First, referring to FIGS. 5A to 5D, a description will be given of a focus position at the start of exposure and a focus position at the start of driving the focus lens 103 during focus bracketing in the embodiment 1.

FIG. 5A is a view showing a start focus position and focus positions for shooting the second and subsequent shot images during focus bracketing.

The start focus position is a focus position (hereafter referred to a "shooting focus position") of a first shot image determined by an AF process at the start of focus bracketing or by user's manual focusing. When the start focus position is determined, focus positions for shooting the second and subsequent shot images are uniquely determined by a focus step 500 which represents the amount of change in focus position between adjacent shot images. The focus step 500 is determined by the system control unit 50 based on a value obtained by a user's operation on the operation unit 70.

FIG. 5B is a view showing changes in focus during exposure and readout in a case where conventional focus bracketing is performed.

A shot image 502 is a first shot image obtained by focus bracketing, and focus positions in its respective areas are expressed as a rectangle.

As shown in FIG. 5B, in conventional focus bracketing, exposure for the first shot image 502 is started at the time when the focus position of the focal lens 103 has come to the start focus position after the focus lens 103 started to be driven at a predetermined focus change speed. Namely, in conventional focus bracketing, a focus position at the start of exposure 501, which is a focus position at which exposure is actually started, corresponds to the start focus position. Thus, in conventional focus bracketing, a position at which a focus position comes to the start focus position in the first shot image (hereafter referred to as "the reference position") is a position at which a result of readout in a first row by the image pickup device of the image pickup unit 22 is shown. For this reason, a focus position in a lower part of the first shot image which represents a result of readout in a last row by the image pickup device is largely displaced from the start focus position.

The amount of change in focus 503 represents the amount of change in focus position during exposure and readout for the first shot image 502.

Figure 5C:
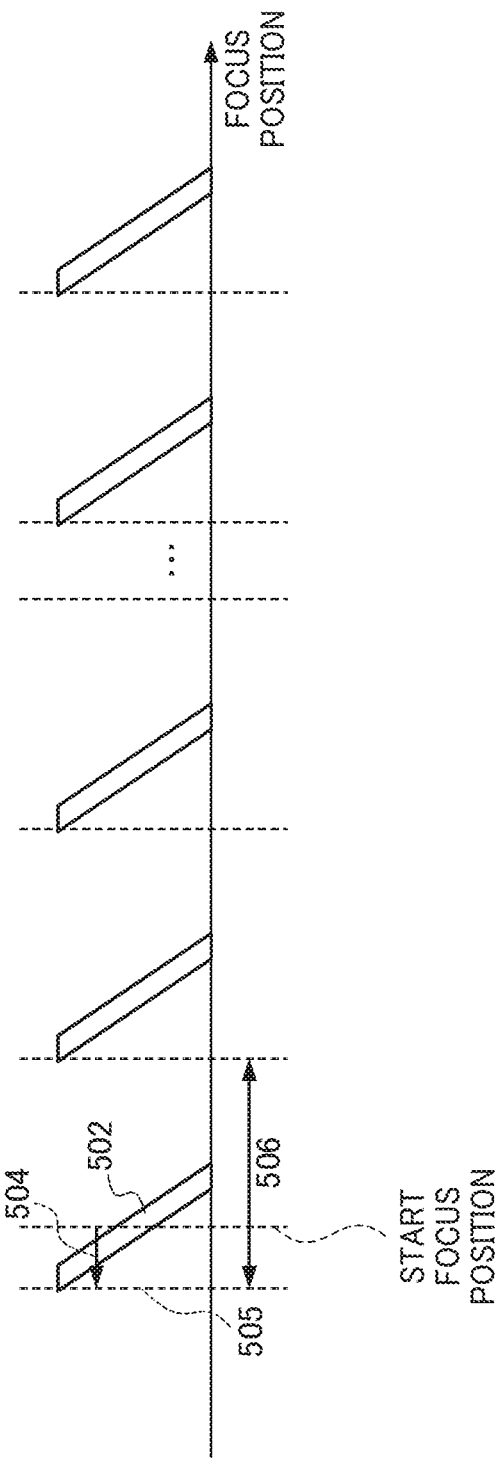
FIG. 5C is a view showing changes in focus position during exposure and readout when focus bracketing according to the embodiment 1 is performed.
Figure 5F:
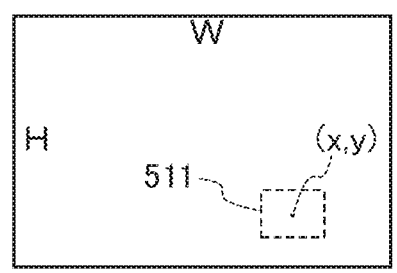
FIG. 5F is a view showing a focus frame that is set in a shot image.

FIG. 5C is a view showing changes in focus during exposure and readout in a case where focus bracketing according to the embodiment 1 is performed.

As shown in FIG. 5C, in the embodiment 1, a central part of the first shot image 502 is set as the reference position in advance by the system control unit 50. Namely, the focus position at the start of exposure 501 in FIG. 5B is corrected so that a focus position in the central part of the first shot image 502 can come to the start focus position. The reference position may be one included in initial settings, or a position designated by a user before focus bracketing may be set as the reference position by the system control unit 50.

The amount of correction 504 means the amount of correction required to correct the focus position at the start of exposure 501 so that the focus position at the central part of the first shot image 502 can come to the start focus position.

A focus position at the start of exposure 505 is a focus position given after the focus position at the start of exposure 501 according to the prior art in FIG. 5B is corrected by advancing by the amount of correction 504 from the start focus position.

Thus, in the embodiment 1, by correcting the conventional focus position at the start of exposure 501 to the focus position at the start of exposure 505, the system control unit 50 makes the focus position at the central part of the first image shot 502 come to the start focus position so that the focus position of the entire image can be close to the start focus position. As a result, in a case where a focus position desired by a user agrees with the start focus position determined by user's manual focusing, a user can select the first shot image as a shot image at the start focus position.

FIG. 5D is a view showing a focus position at the start of driving the focus lens 103 in focus bracketing according to the embodiment 1.

The amount of correction 507 is the amount of change in focus required for the focus lens 103 to reach a predetermined focus change speed after it is at a standstill.

A focus position at the start of driving 508 is a focus position shifted by the amount of correction 507 from the focus position at the start of exposure 505 in a direction opposite to a focus changing direction in focus bracketing. When focus bracketing is started, the focus lens 103 moves to the focus position at the start of driving 508, then stops, and starts moving at the same time as a first issuance of the vertical synchronization signal.

Figure 6:
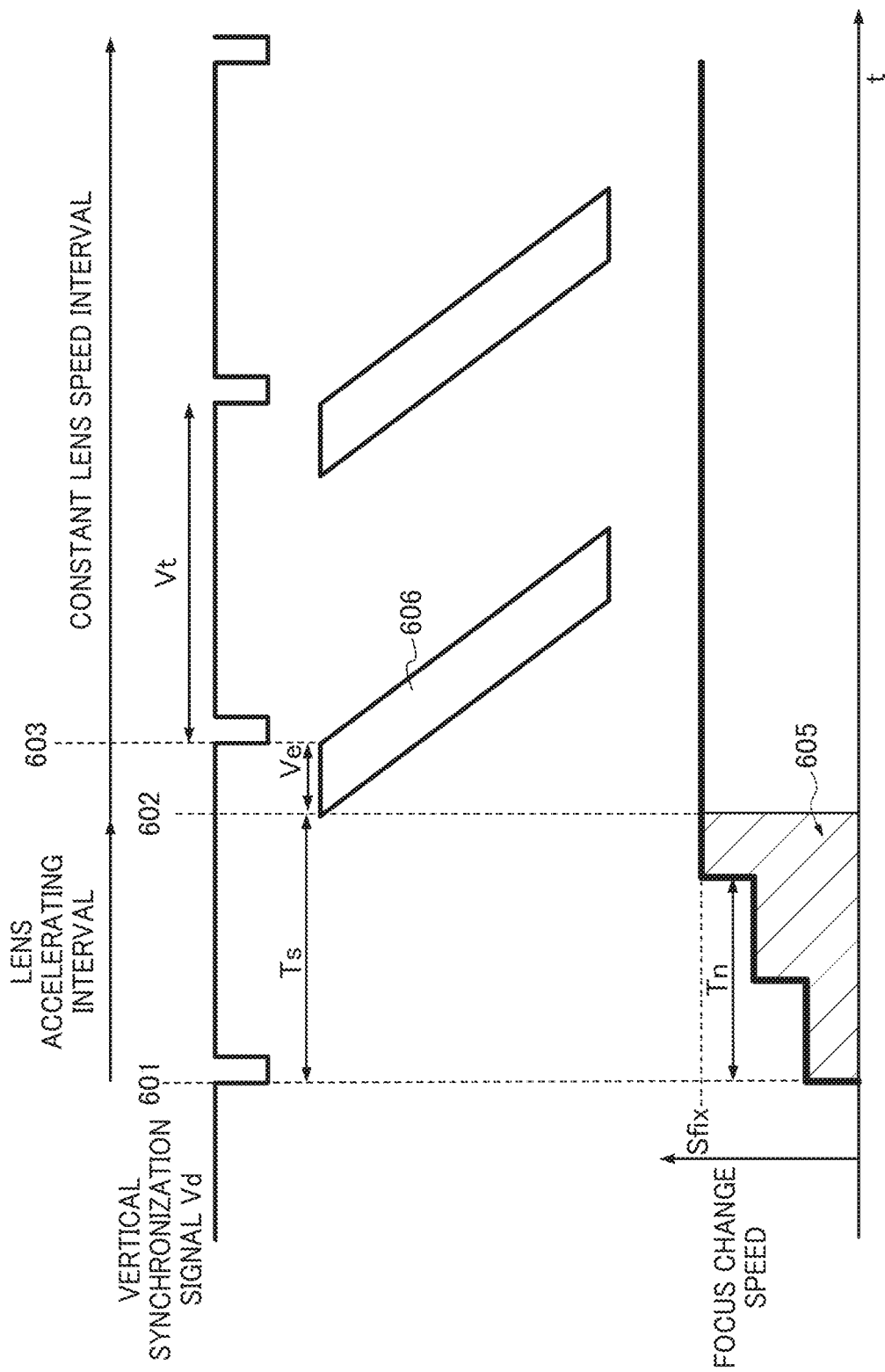
FIG. 6 is a timing chart of the focus bracketing process according to the embodiment 1.

FIG. 6 is a timing chart of a focus bracketing process according to the embodiment 1.

FIG. 6 shows a vertical synchronization signal Vd issued to the image pickup unit 22 by the system control unit 50 and rectangular areas 606 corresponding to exposure and readout by the image pickup unit 22.

Referring to FIG. 6, reference numeral 601 denotes a time at which the system control unit 50 starts driving the focus lens 103 which has been at a standstill, and also issues the vertical synchronization signal Vd to the image pickup unit 22 for the first time.

Shooting intervals Vt are intervals at which the system control unit 50 issues the vertical synchronization signal Vd to the image pickup unit 22 and are equal to a time period required for the focus lens 103, which is driven at a predetermined focus change speed, to move across the focus step 500 set in advance.

An exposure starting time 602 is a time at which the focus lens 103 passes through the focus position at the start of exposure 505 in FIG. 5C at which the image pickup unit 22 actually starts exposure. The exposure starting time 602 is set to a time that is an exposure time period Ve earlier than a time 603 that is the shooting interval Vt later than the time 601. Namely, whenever the vertical synchronization signal Vd is issued at the shooting intervals Vt, the image pickup unit 22 starts exposure at a time that is a time period Ts (=Vt−Ve) later than the issuance of the vertical synchronization signal Vd. From the exposure starting time 602 onward, the focus lens 103 is driven at the predetermined focus change speed (in the constant lens speed interval) until focus bracketing according to the present embodiment is ended.

FIG. 6 also shows the focus change speed caused by driving the focus lens 103.

A hatched area 605 in FIG. 6 indicates the amount of change in the focus of the focus lens 103 in the time period Ts, where the focus lens 103 starts being driven from a standstill at the time 601 that is the beginning of the time period Ts. The first shot image and the second shot image change their focus in the same way as long as the focus change speed has reached a predetermined focus change speed Sfix within the time period Ts as shown in FIG. 6. Namely, in the present embodiment, the time period Ts is determined such that a time period Tn required for the focus lens 103 to reach the predetermined focus change speed Sfix after starting to be driven at the time 601 falls within the time period Ts (Tn<Ts).

The amount of change in focus 605 corresponds to the hatched area in FIG. 6 and corresponds to the amount of correction 507 described with reference to FIG. 5D.

Referring to FIG. 6, the shooting intervals Vt at which the system control unit 50 issues the vertical synchronization signal Vd in the time period Ts before shooting is started by the image pickup unit 22 are the same as those in the lens constant speed interval after shooting is started by the image pickup unit 22, but the present invention is not limited to this. When the focus lens 103 has low driving performance, or when the exposure time period Ve is long, and the time period Ts is short, there may be a case where the focus change speed of the focus lens 103 cannot reach the predetermined focus change speed Sfix within the time period Ts. In this case, the time period Ts may be set to be equal to or longer than the time period Tn. Moreover, the time at which the vertical synchronization signal Vd is issued for the first time after the focus bracketing starts may be advanced from the time 601 by the shooting interval Vt, and at this time, the focus lens 103 may start to be driven.

Figure 3:
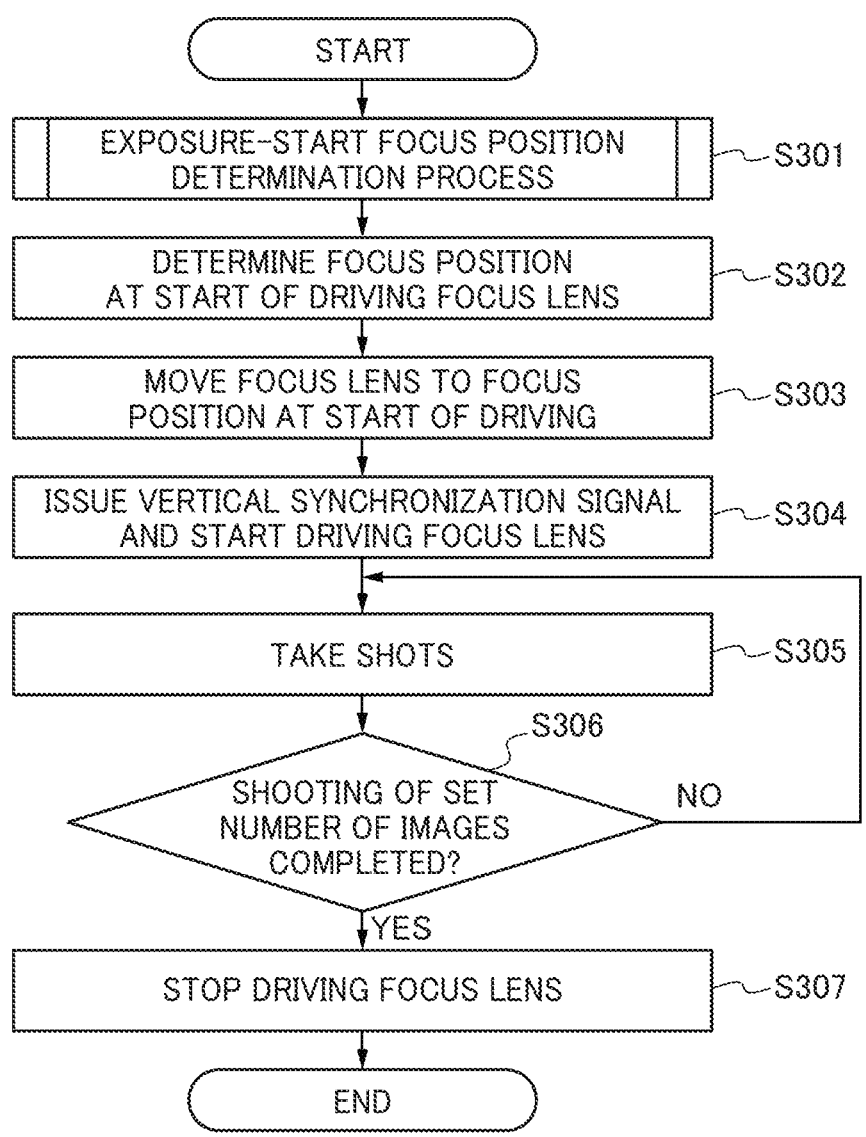
FIG. 3 is a flowchart of a focus bracketing process according to the embodiment 1.

FIG. 3 is a flowchart of a focus bracketing process in the embodiment 1.

Steps in FIG. 3 are implemented by the system control unit 50 expanding a program stored in the nonvolatile memory 56 and expanded on the system memory 52. It should be noted that the steps in FIG. 3 are executed based on the assumption that the focus step 500 and the reference position at which a focus position comes to the start focus position in a first shot image generated in the focus bracketing, are set in advance by the system control unit 50.

When the present process is started by a user pressing the shutter button 61 all the way down, the system control unit 50 carries out the process of determining a focus position at the start of exposure (an exposure-start focus position determination process) first in step S301 to determine the focus position at the start of exposure 505 in FIG. 5C. Details of the process of determining a focus position at the start of exposure will be described later with reference to FIG. 4.

Next, in step S302, the system control unit 50 determines the focus position at the start of driving 508 for the focus lens 103 described above with reference to FIG. 5D.

In step S303, the system control unit 50 moves the focus lens 103 to the focus position at the start of driving 508 and brings it to a standstill, and then in step S304, the system control unit 50 issues the vertical synchronization signal Vd to the image pickup unit 22. It should be noted that the focus position at the start of driving 508 is obtained by correcting the start focus position, which is set in advance, by the amount of correction 504 (FIG. 5C) and the amount of correction 507 as described above with reference to FIG. 5D. Namely, the system control unit 50 issues the vertical synchronization signal Vd to the image pickup unit 22 on the basis of the start focus position set in advance. At the same time, the system control unit 50 starts driving the focus lens 103. The time at which the step S304 is executed corresponds to the time 601 in FIG. 6. As a result of the steps S303 and S304, appropriate focus positions of the focus lens 103 which continues to be driven during focus bracketing are synchronized with times when exposure and readout are performed by the image pickup unit 22.

Then, in step S305, when the time period Ts has elapsed since the latest issuance of the vertical synchronization signal Vd, the image pickup unit 22 starts exposure to generate a shot image. As a result, a central part of the generated shot image is set as the reference position, and hence a focus position in the central part of the shot image 502 comes to the start focus position. It should be noted that the system control unit 50 controls driving of the focus lens 103 so that the focus change speed can be constant during focus bracketing.

In step S306, the system control unit 50 judges whether or not shooting of a set number of images has been completed, that is, whether or not exposure and read by the image pickup device have been completed a predetermined number of times set in advance. As a result of this judgment, when the shooting has not been completed, the system control unit 50 issues the vertical synchronization signal Vd when the shooting interval Vt has elapsed since the latest issuance of the vertical synchronization signal Vd, and then the process returns to the step S305. On the other hand, when the shooting has been completed, the process proceeds to step S307, in which the system control unit 50 in turn stops driving the focus lens 103 and ends the present process.

Figure 4:
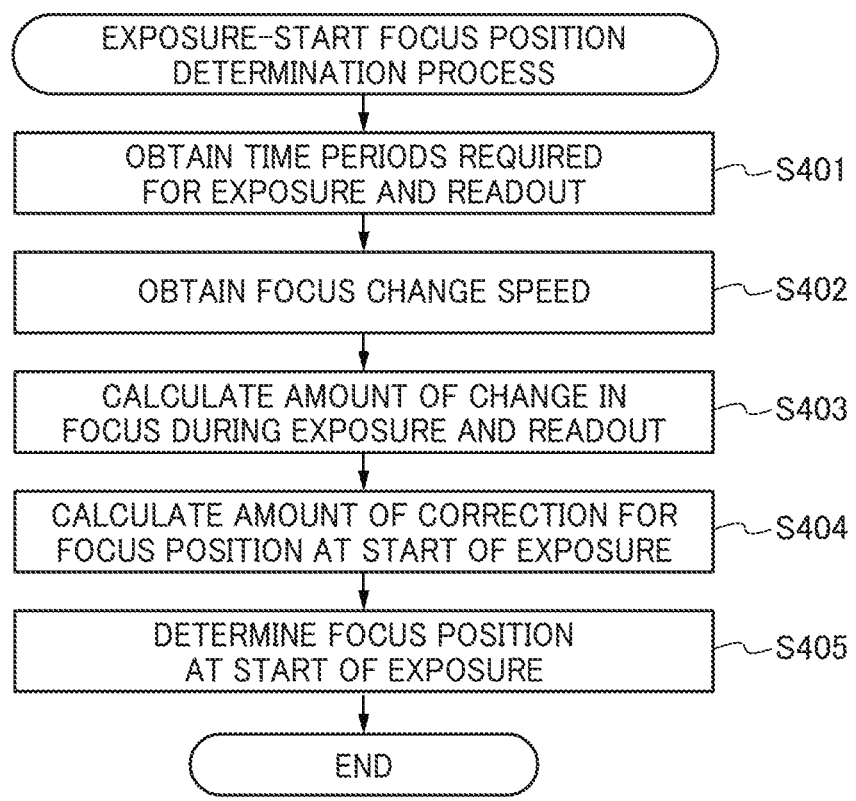
FIG. 4 is a flowchart of an exposure-start focus position determination process in step S301 in FIG. 3.

Referring to a flowchart of FIG. 4, a description will now be given of the exposure-start focus position determination process in the step S301 in FIG. 3.

In this process, first, in step S401, the system control unit 50 obtains a readout time period required for one readout by the pickup unit 22 for obtaining one shot image and an exposure time period determined according to shooting conditions.

Next, in step S402, the system control unit 50 obtains the focus change speed of the focus lens 103. This focus change speed is equal to the predetermined focus change speed Sfix in FIG. 6.

Then, in step S403, the system control unit 50 calculates the amount of change in focus 503 in the exposure and readout period.

In step S404, based on the amount of change in focus 503 calculated in the step S403, the system control unit 50 calculates the amount of correction 504 from the conventional focus position at the start of exposure 501. The amount of correction 504 is determined based on the amount of change in focus 503 during exposure and readout calculated in the step S403 and a reference position of a shot image set in advance. For example, when the reference position is a central part of a shot image, a half of the amount of change in focus 503 is determined as the amount of correction 504 by calculation. As a result, the time at which a central part of a shot image is exposed can be synchronized with the time at which the focus lens 103 passes through the start focus position.

It should be noted that the reference position according to the present invention is not limited to a central part of a shot image as with the present embodiment. For example, the system control unit 50 obtains a focus frame for use in bringing a subject into focus, which is set in an AF process at the start of shooting or by user's manual focusing, and the center of this focus frame may be used as the reference position. A description will now be given of this variation with reference to FIGS. 5E and 5F.

FIG. 5E is a view showing a focus position of the focus lens 103 at the start of exposure during focus bracketing according to the variation of the embodiment 1.

In this variation, the system control unit 50 corrects the conventional focus position at the start of exposure 501 according to the center position of the focus frame. For example, where the number of vertical pixels of a shot image is H, that of horizontal pixels of a shot image is W, a vertical coordinate at the center of the focus frame is y, and a horizontal coordinate at the center of the focus frame is x, the amount of correction 509 for the focus position at the start of exposure 501 is calculated using the following equation:

(The amount of correction 509)=(The amount of change in focus 503 during exposure and readout)×y/H Namely, the focus position at the start of exposure 510 in this variation can be obtained by correcting the conventional focus position at the start of exposure 501 in FIG. 5B to a time that is the amount of correction 509 earlier than the start focus position.

Referring to FIG. 4 again, in step 405, based on the start focus position and the amount of correction 504 (or the amount of correction 509) calculated in the step S404, the system control unit 50 determines a focus position at which exposure is actually started, and ends the present process.

As a result of the above described process, the amount of correction for the exposure start position and the time at which exposure is started, which are required for focus bracketing using the technique of driving a lens during exposure, can be determined.

Embodiment 2

A focus bracketing process in the embodiment 2 differs from that in the embodiment 1 only in that when the vertical synchronous signal is issued for the first time, the focus lens 103 is at a standstill in the embodiment 1, whereas the focus lens 103 has already started to be driven at the focus change speed Sfix in the embodiment 2. Thus, in the following description of the embodiment 2, the same component elements as those in the embodiment 1 are denoted by the same reference numerals, duplicate description of which, therefore, is omitted.

Referring to a flowchart of FIG. 8, a description will now be given of the focus bracketing process in the embodiment 2. As with FIG. 6, FIG. 8 shows the vertical synchronization signal Vd issued by to the image pickup unit 22 by the system control unit 50, the focus change speed, and rectangular areas 803 corresponding to exposure and readout performed by the image pickup unit 22.

Referring to FIG. 8, an exposure starting time 801 is a time at which the focus lens 103 passes through the focus position at the start of exposure 505 in FIG. 5C at which the image pickup unit 22 actually starts exposure. As with the embodiment 1, focus bracketing is performed by using the shooting intervals Vt and the exposure time period Ve in the embodiment 2 as well. Thus, to start exposure at the exposure starting time 801, the system control unit 50 issues the vertical synchronization signal Vd, which is for controlling the image pickup unit 22, for the first time at a time 802 that is the time period Ts (=Vt−Ye) earlier than the exposure starting time 801.

In the present embodiment, when focus bracketing is started, the focus lens 103 has already started to be driven at the focus change speed Sfix. For this reason, a focus position of the focus lens 103 at the time 802 when the vertical synchronization signal Vd is issued for the first time (a focus position at the start of image pickup control) is obtained by shifting the focus position at the start of exposure 505 by Ts×Sfix in a direction opposite to the focus changing direction.

Namely, in the present embodiment, after starting the focus bracketing process, the system control unit 50 issues the vertical synchronization signal Vd to the image pickup unit 22 for the first time at the time 802 at which the focus lens 103 reaches the focus position at the start of image pickup control (namely, the system control unit 50 issues the vertical synchronization signal Vd to the image pickup unit 22 on the basis of the start focus position set in advance). At the same time as the first issuance of the vertical synchronization signal Vd, the system control unit 50 also makes settings required for exposure starting at the exposure start time 801. Moreover, whenever the vertical synchronization signal Vd is issued at the shooting intervals Vt, the image pickup unit 22 starts exposure at a time when the time Ts has elapsed since the issuance of the vertical synchronization signal Vd.

FIG. 7 is a flowchart of the focus bracketing process in the embodiment 2.

As with FIG. 3 steps in FIG. 7 are implemented by the system control unit 50 executing a program stored in the nonvolatile memory 56 and expanded on the system memory 52. It should be noted that the steps in FIG. 7 are executed based on the assumption that the focus step 500 and the reference position at which the start focus position of the first shot image generated by focus bracketing is the focus position are set in advance by the system control unit 50.

When the process is started by a user pressing the shutter button 61 all the way down, first, the system control unit 50 carries out the exposure-start focus position determination process in step S701. This exposure-start focus position determination process is the same as that in the steps S301 and S401 to 405, and therefore, description thereof is omitted.

Next, in step S702, the system control unit 50 determines the focus position at the start of image pickup control at which image pickup control by the image pickup unit 22 is started.

In step S703, the system control unit 50 starts driving the focus lens 103. After that, when the focus lens 103 moving at the focus change speed Sfix has reached the focus position at the start of image pickup control described above with reference to FIG. 8, the system control unit 50 determines that it is the time 802, and then the process proceeds to step S704.

In the step S704, the system control unit 50 makes settings required for image pickup and issues the vertical synchronization signal Vd to the image pickup unit 22.

Then, in step S705, when the time Ts has elapsed since the latest issuance of the vertical synchronization signal Vd, the image pickup unit 22 starts exposure to generate a shot image.

In step S706, the system control unit 50 judges whether or not shooting of a set number of images has been completed. As a result of this judgment, when the shooting has not been completed, the system control unit 50 issues the vertical synchronization signal Vd when the shooting interval Vt has elapsed since the latest issuance of the vertical synchronization signal Vd, and then the process returns to the step S705. On the other hand, when the shooting has been completed, the process proceeds to step S707, in which the system control unit 50 in turn stops driving the focus lens 103 and ends the present process.

The focus lens 103, not the system control unit 50, may directly issue the vertical synchronization signal Vd to the image pickup unit 22 when the focus lens 103 has reached the focus position at the start of image pickup control. For example, the focus lens 103 may be equipped with at least one processor, and this processor may directly issue the vertical synchronization signal Vd to the image pickup unit 22. This enables the focus lens 103 to quickly issue the vertical synchronization signal Vd to the image pickup unit 22 when the focus lens 103 has reached the focus position at the start of image pickup control.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-121811, filed Jun. 28, 2019, which is hereby incorporated by reference herein in its entirety.

What is claimed is:

1. An image pickup apparatus that performs focus bracketing in which exposure and readout of an image pickup device are performed a number of times set in advance while a focus lens is driven without being stopped, so as to generate a set number of shot images, the image pickup apparatus comprising:
   a focus lens;
   an image pickup device;
   a memory device that stores a set of instructions; and
   at least one processor that executes the set of instructions to:
   set a focus step that is an amount of change in focus position between adjacent shot images of the set number of shot images;
   control driving of the focus lens so as to make the focus lens achieve a focus change speed such that the amount of change in focus per unit time is constant;
   issue a vertical synchronization signal to the image pickup device on a basis of a start focus position set in advance;

set a reference position at which a focus position comes to the start focus position in a first shot image generated in the focus bracketing; and extract areas in focus from the set number of shot images generated by the exposure and the readout of the image pickup device being performed while the focus lens is driven without being stopped and merge the areas in focus.

2. The image pickup apparatus according to claim 1, wherein in setting the reference position, the at least one processor sets a central part of the first shot image as the reference position.

3. The image pickup apparatus according to claim 1, wherein the at least one processor executes instructions in the memory device to obtain a focus frame used to bring a subject into focus, and in setting the reference position, the at least one processor sets a center of the focus frame in the first shot image as the reference position.

4. The image pickup apparatus according to claim 1, wherein the at least one processor executes instructions in the memory device to:

based on the amount of change in focus per unit time and the set focus step, determine intervals at which the vertical synchronization signal is issued, and issue the vertical synchronization signal to the image pickup device at the intervals.

5. The image pickup apparatus according to claim 1, wherein the at least one processor executes instructions in the memory device to determine a focus position at a start of exposure, based on a time period required for one readout by the image pickup device, an exposure time period determined based on shooting conditions, the focus change speed, and the reference position.

6. The image pickup apparatus according to claim 5, wherein the at least one processor executes instructions in the memory device to:

calculate an amount of change in the focus of the focus lens required to cause the focus lens having been at a standstill to reach the focus change speed by control of the driving of the focus lens; and based on the focus position at the start of exposure and the calculated amount of change in the focus of the focus lens, determine a focus position at a start of driving the focus lens being at a standstill at a time when the vertical synchronization signal is issued for the first time.

7. The image pickup apparatus according to claim 5, wherein the at least one processor executes instructions in the memory device to:

based on the focus position at the start of exposure and the focus change speed, determine a focus position of the focus lens, which is being driven at the focus change speed, at a time when the vertical synchronization signal is issued for the first time.

8. A control method for an image pickup apparatus that performs focus bracketing in which exposure and readout of an image pickup device are performed a number of times set in advance while a focus lens is driven without being stopped, so as to generate a set number of shot images, the control method comprising:

setting a focus step that is an amount of change in focus position between adjacent shot images of the set number of shot images;

controlling driving of the focus lens so as to make the focus lens achieve a focus change speed such that the amount of change in focus per unit time is constant;

issuing a vertical synchronization signal to the image pickup device on a basis of a start focus position set in advance;

setting a reference position at which a focus position comes to the start focus position in a first shot image generated in the focus bracketing; and extracting areas in focus from the set number of shot images generated by the exposure and the readout of the image pickup device being performed while the focus lens is driven without being stopped and merge the areas in focus.

9. A non-transitory computer-readable storage medium storing a program for causing a computer to execute a control method for a control method for an image pickup apparatus that performs focus bracketing in which exposure and readout of an image pickup device are performed a number of times set in advance while a focus lens is driven without being stopped, so as to generate a set number of shot images, the control method comprising:

setting a focus step that is an amount of change in focus position between adjacent shot images of the set number of shot images;

controlling driving of the focus lens so as to make the focus lens achieve a focus change speed such that the amount of change in focus per unit time is constant;

issuing a vertical synchronization signal to the image pickup device on a basis of a start focus position set in advance;

setting a reference position at which a focus position comes to the start focus position in a first shot image generated in the focus bracketing; and extracting areas in focus from the set number of shot images generated by the exposure and the readout of the image pickup device being performed while the focus lens is driven without being stopped and merge the areas in focus.

* * * * *